(12) United States Patent
Iwamatsu

(10) Patent No.: US 11,132,778 B2
(45) Date of Patent: Sep. 28, 2021

(54) IMAGE ANALYSIS APPARATUS, IMAGE ANALYSIS METHOD, AND RECORDING MEDIUM

(71) Applicant: NEC Corporation, Tokyo (JP)

(72) Inventor: Yosuke Iwamatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 16/495,465

(22) PCT Filed: Mar. 29, 2017

(86) PCT No.: PCT/JP2017/012817
§ 371 (c)(1),
(2) Date: Sep. 19, 2019

(87) PCT Pub. No.: WO2018/179119
PCT Pub. Date: Oct. 4, 2018

(65) Prior Publication Data
US 2020/0074612 A1   Mar. 5, 2020

(51) Int. Cl.
*G06T 7/00* (2017.01)
*G06T 7/70* (2017.01)
*G06T 7/60* (2017.01)

(52) U.S. Cl.
CPC .............. *G06T 7/0002* (2013.01); *G06T 7/60* (2013.01); *G06T 7/70* (2017.01); *G06T 2207/30168* (2013.01)

(58) Field of Classification Search
None
See application file for complete search history.

(56) References Cited

U.S. PATENT DOCUMENTS

2015/0146010 A1* 5/2015 Yokozeki ......... H04N 5/232945
348/169

FOREIGN PATENT DOCUMENTS

| JP | 4992945 B2 | 8/2012 |
|----|------------|--------|
| JP | 2012-173879 A | 9/2012 |
| JP | 2015-219681 A | 12/2015 |

OTHER PUBLICATIONS

Nesime Tatbul et al., "Load Shedding in a Data Stream Manager," Proceedings of the 29th International Conference on VLDB, VLDB Endowment, Sep. 2003, pp. 309-320, vol. 29.

(Continued)

*Primary Examiner* — Leon Flores
(74) *Attorney, Agent, or Firm* — Sughrue Mion, PLLC

(57) ABSTRACT

The present invention reduces the amount of data outputted while maintaining the accuracy of an analysis process with a small delay amount, by an image analysis apparatus provided with: a deduction unit that deduces a second quality concerning an object in a second image, which is different from a first image associated with object data relating to an object to be inputted, on the basis of a first quality concerning the object relating to the object data and on the basis of the state of the object in the second image, the state being obtained by using a state model for deducing the position and the size of the object from the object data, while using a quality model for deducing the second quality concerning the object; and a determination unit that determines whether to use the object data for analysis on the basis of the deduced second quality.

9 Claims, 13 Drawing Sheets

(56) References Cited

OTHER PUBLICATIONS

Written Opinion of the International Searching Authority of PCT/JP2017/012817 dated Jun. 20, 2017.
International Search Report of PCT/JP2017/012817 dated Jun. 20, 2017.

* cited by examiner

$$Y_{next} = Y_{cur} + 200 \pm 50$$

$$S_{next} = S_{cur} * 2$$

WHEN Y<800  F=1.0

WHEN Y>=800  F=0.5

IN CASE OF F>0.7
  $Q_{next} = (1-Q_{cur})*(S_{next}-S_{cur})/(S_{max}-S_{cur}) + Q_{cur}$ IN CASES OTHER THAN THE ABOVE,
  $Q_{next} = 0.1$

Fig. 10

| OBJECT NUMBER | POSITION (Ycur) | SIZE (Scur) | QUALITY SCORE (Qcur) | POSITION (Ynext) | SIZE (Snext) | QUALITY SCORE (Qnext) |
|---|---|---|---|---|---|---|
| 1 | 200 | 100x100 | 0.6 | 350~450 | 141x141 | 0.649 |
| 2 | 600 | 200x200 | 0.8 | 750~850 | 282x282 | 0.899(50%) 0.1(50%) |

Fig. 11

| OBJECT NUMBER (111) | WINDOW NUMBER (112) | QUALITY SCORE (113) | DEDUCTED QUALITY SCORE (114) | DETERMINATION RESULT (115) |
|---|---|---|---|---|
| 1 | 1 | 0.6 | 0.649 | NOT TO OUTPUT |
| 1 | 2 | 0.65 | 0.710 | NOT TO OUTPUT |
| 1 | 3 | 0.7 | 0.786 | NOT TO OUTPUT |
| 1 | 4 | 0.8 | 0.899 | NOT TO OUTPUT |
| 1 | 5 | 0.9 | 0.1 | TO OUTPUT |

Fig. 12

| OBJECT NUMBER (111) | WINDOW NUMBER (112) | QUALITY SCORE (113) | DEDUCTED QUALITY SCORE (114) | DETERMINATION RESULT (125) |
|---|---|---|---|---|
| 1 | 1 | 0.6 | 0.649 | TO OUTPUT |
| 1 | 2 | 0.65 | 0.710 | NOT TO OUTPUT |
| 1 | 3 | 0.7 | 0.786 | NOT TO OUTPUT |
| 1 | 4 | 0.8 | 0.899 | TO OUTPUT |
| 1 | 5 | 0.9 | 0.1 | TO OUTPUT |

Fig. 15

| OBJECT NUMBER | FRAME NUMBER | WINDOW NUMBER | POSITION | SIZE | ORIENTATION | OBJECT IMAGE | QUALITY SCORE |
|---|---|---|---|---|---|---|---|
| 1 | 3 | 5 | (100,600) | 400*400 | 1.0 | IMAGE xx | 0.9 |
| 2 | 6 | 5 | (200,720) | 500*500 | 1.0 | IMAGE yy | 0.899 |

IMAGE ANALYSIS APPARATUS, IMAGE ANALYSIS METHOD, AND RECORDING MEDIUM

CROSS REFERENCE TO RELATED APPLICATIONS

This application is a National Stage of International Application No. PCT/JP2017/012817 filed Mar. 29, 2017.

TECHNICAL FIELD

The present disclosure relates to an image analysis apparatus, an image analysis method and a recording medium.

BACKGROUND ART

In image analysis, processing of extracting a feature amount is performed for each object included in a frame image. The number of detected objects has been increased due to an increase of resolution of an imaging apparatus, and accordingly, an amount of extraction processing of the feature amount tends to be increased. Hence, a high-performance apparatus and the like are required to perform analysis processing for objects in all frame images without a processing overflow, and this result in a cost increase. Moreover, there is a possibility that a delay amount is increased by an increase of a throughput.

PTL 1 describes a method of generating stream data from which components not to be processed are thinned out on the basis of query information indicating components to be or not to be processed.

Moreover, NPL 1 describes optimization of an amount of data to be thinned out.

CITATION LIST

Patent Literature

[PTL 1] Japanese Patent No. 4992945

Non Patent Literature

[NPL 1] Nesime Tatbul et al., "Load Shedding in a Data Stream Manager", Proceedings of the 29th International Conference on VLDB, VLDB Endowment, September 2003, vol. 29, pages 309 to 320

SUMMARY OF INVENTION

Technical Problem

However, in the technique described in PTL 1, when components to be processed are increased, a thinning amount decreases, and there is a possibility that data amount of stream data is not able to be reduced sufficiently.

Moreover, in image data in which imaging quality changes every moment, there is increased possibility that a degree of quality degradation of an image for use in analysis processing may not be constant due to thinning of such frame images. Hence, when analysis processing is performed by using data acquired by applying the technique described in NPL 1, there is a possibility that accuracy of an analysis result may decrease.

The present disclosure has been made in view of the above-described problems. An object of the present disclosure to provide a technique for reducing an amount of data to be output with a small delay amount while maintaining accuracy of analysis processing.

Solution to Problem

An image analysis apparatus according to an aspect of the present disclosure includes: a deduction means for deducing second quality regarding an object in a second image different from a first image related to object data regarding the object, the object being to be input to the image analysis apparatus, the deducing being performed by using a state of the object in the second image, the state being acquired by using a state model for deducing a position and a size of the object from the object data, using first quality regarding the object related to the object data, and using a quality model for deducing the second quality; and a determination means for determining whether or not to use the object data for analysis on the basis of the deduced second quality.

Moreover, an image analysis method according to an aspect of the present disclosure includes: deducing second quality regarding an object in a second image different from a first image related to object data regarding the object, the object being to be input to the image analysis apparatus, the deducing being performed by using a state of the object in the second image, the state being acquired by using a state model for deducing a position and a size of the object from the object data, using first quality regarding the object related to the object data, and using a quality model for deducing the second quality; and determining whether or not to use the object data for analysis on the basis of the deduced second quality.

Note that, a computer program, which achieves the above-described apparatus or method by using a computer, and a computer-readable non-transitory recording medium, in which the computer program is stored, are also incorporated in the scope of the present disclosure.

Advantageous Effects of Invention

According to the present disclosure, the amount of data to be output is able to be reduced with a small delay amount while maintaining the accuracy of the analysis processing.

BRIEF DESCRIPTION OF DRAWINGS

FIG. 8 is a diagram for explaining another example of the state model to be stored in the storage section of the object data determination unit in the first example embodiment.

FIG. 9 is a diagram for explaining another example of the quality model to be stored in the storage section of the object data determination unit in the first example embodiment.

FIG. 10 is a diagram illustrating another example of the results of the deduction processing in the deduction section of the object data determination unit in the first example embodiment.

FIG. 11 is a diagram illustrating one example of results of determination processing in a determination section of the object data determination unit in the first example embodiment.

FIG. 12 is a diagram illustrating another example of the results of the determination processing in the determination section of the object data determination unit in the first example embodiment.

FIG. 15 is a diagram illustrating one example of output data to be output by the object data determination unit in the first example embodiment.

EXAMPLE EMBODIMENT

First Example Embodiment

Figure 1:
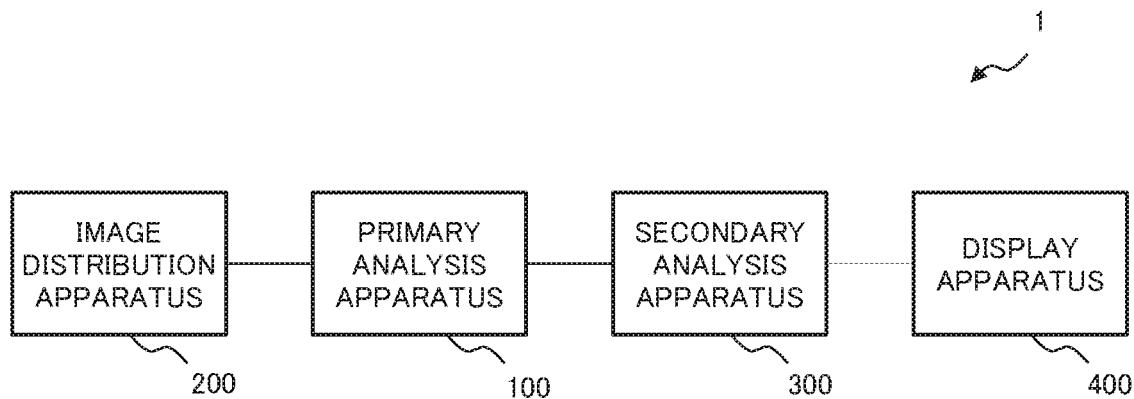
FIG. 1 is a diagram illustrating one example of an entire configuration of an image processing system according to a first example embodiment of the present disclosure.

A first example embodiment of the present disclosure will be described in detail with reference to the drawings. FIG. 1 is a diagram illustrating one example of an entire configuration of an image processing system 1 according to the present example embodiment. As illustrated in FIG. 1, the image processing system 1 according to the present example embodiment includes a primary analysis apparatus 100, an image distribution apparatus 200, a secondary analysis apparatus 300, and a display apparatus 400. Note that, the configuration of the image processing system 1 is merely an example, and the image processing system 1 is not limited to the configuration illustrated in FIG. 1. For example, the image processing system 1 may include apparatuses which are not included in the configuration illustrated in FIG. 1.

The image distribution apparatus 200 distributes image data to the primary analysis apparatus 100. The image distribution apparatus 200 is achieved, for example, by an imaging apparatus (imaging unit) such as a video camera, a surveillance camera, a network camera and an intelligence camera, which captures an image of an object. The image distribution apparatus 200 distributes the captured image data to the primary analysis apparatus 100.

The primary analysis apparatus 100 performs processing for determining valid data, which are data valid for analysis to be performed by the secondary analysis apparatus 300, from the image data received from the image distribution apparatus 200. The primary analysis apparatus 100 will be described later with reference to another drawing. The primary analysis apparatus 100 extracts a feature amount of the object, which is included in the determined valid data, and supplies the extracted feature amount of the object to the secondary analysis apparatus 300.

The secondary analysis apparatus 300 performs analysis by using the feature amount of the object, which is output from the primary analysis apparatus 100. A type of the analysis to be performed by the secondary analysis apparatus 300 is not particularly limited, and for example, may include face authentication, vehicle body authentication, and the like. The secondary analysis apparatus 300 sends a result of the analysis to the display apparatus 400.

The display apparatus 400 displays, on a display unit, such an analysis result in the secondary analysis apparatus 300. The display apparatus 400 is achieved, for example, by a liquid crystal display and the like.

Figure 2:
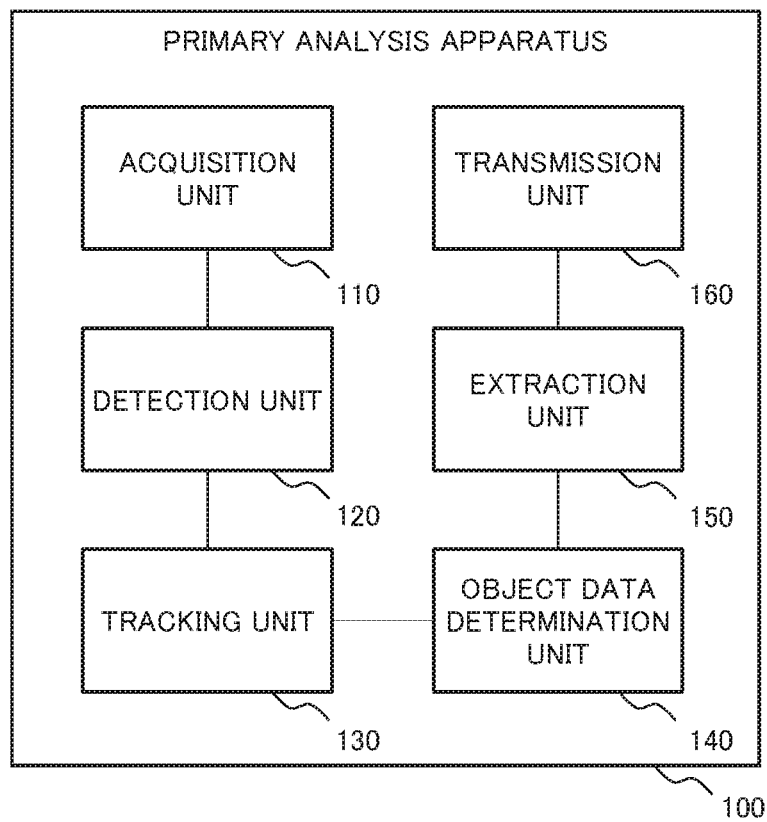
FIG. 2 is a functional block diagram illustrating one example of a functional configuration of a primary analysis apparatus of the image processing system according to the first example embodiment.

FIG. 2 is a functional block diagram illustrating one example of a functional configuration of the primary analysis apparatus 100 of the image processing system 1 according to the present example embodiment. As illustrated in FIG. 2, the primary analysis apparatus 100 includes an acquisition unit 110, a detection unit 120, a tracking unit 130, an object data determination unit 140, an extraction unit 150 and a transmission unit 160.

The acquisition unit 110 acquires image data to be input to the primary analysis apparatus 100. Note that, the present example embodiment will be described on the assumption that the image data are moving image data (video data) including a plurality of frame images. However, the image data may represent each of the plurality of frame images.

The acquisition unit 110 may acquire image data from the image distribution apparatus 200, or may acquire image data from a recording unit in which the image data distributed by the image distribution apparatus 200 are recorded. The acquisition unit 110 divides the acquired image data into a plurality of frame images, and supplies the frame images to the detection unit 120.

The detection unit 120 detects the object from each of the plurality of frame images. The detection unit 120 receives the frame image supplied from the acquisition unit 110. The detection unit 120 detects one or a plurality of objects from the received frame image. When such an object is included in the frame image, the detection unit 120 extracts, from the frame image, a region of the detected object on the frame image as an object region. In the present example embodiment, the detection unit 120 defines a center coordinate of the object region as position information indicating a position of the object region. However, the position information may not be the center coordinate but be, for example, an upper left coordinate of the object region or coordinates indicating other positions. Note that, since the position information expressed by a coordinate of the object region indicates the position of the object on the frame image, the position information can be said to indicate a position of the object. Moreover, the present example embodiment will be described on the assumption that a size of the object region is a size of the object.

The present example embodiment will be described on the assumption that the object is a person, and that the object region to be detected by the detection unit 120 is a region of a human face. Note that the object region may be a region of the whole person. Moreover, the object may be an object other than the person.

The detection unit 120 may further detect a direction of the object. Note that a detection method of the object and a detection method of the direction of the object are not particularly limited, and arbitrary methods may be adopted. Moreover, an extraction method of the object region is not particularly limited, and an arbitrary method may be adopted. Moreover, a shape of the object region to be extracted from the frame image by the detection unit 120 may be a rectangular shape, a circular shape or other shapes.

As described above, the detection unit 120 detects a position of such an object and a size and a direction of the object as states of the object in the frame image as a detection target.

Moreover, the detection unit 120 calculates a quality score, which indicates quality regarding the detected object (also referred to as first quality), for each extracted object region. The quality regarding the object is determined in response to a type of the analysis to be performed by the secondary analysis apparatus 300. For example, when the secondary analysis apparatus 300 is an apparatus that performs face authentication, the detection unit 120 calculates the quality score in such a way that the quality of the object region is improved as an image of the object region (also referred to as an object image) is an image from which a feature amount for use in the face authentication can be extracted more. Moreover, when the secondary analysis apparatus 300 is an apparatus that performs analysis by using feature points of the whole of the object, the detection unit 120 calculates the quality score in such a way that the quality of the object region is improved when the whole of the object is included in the object region than when a part of the object is included therein. Moreover, the detection unit 120 may calculate the quality score on the basis of a camera parameter and a condition at the time when the object included in the frame image is imaged. The condition at the time of imaging may be any condition as long as the condition relates to quality, for example, brightness at the imaging time, a distance to the object, a time, and the like. In other words, the detection unit 120 may calculate a quality score in which image quality of the object and the like in the frame image are considered. Note that, a calculation method of the quality score is not particularly limited, and any method may be adopted.

The detection unit 120 associates a frame number indicating a frame image from which the object is detected, the state of the object (the position of the object, the size of the object, and the direction of the object), the object image and the quality score with one another, and outputs a result of the association as a detection result. It is desirable that the detection result be stored in a memory or the like (not illustrated) for each object. Note that the detection unit 120 may output a frame image as an extraction source of the object image in place of the object image or in addition to the object image.

The tracking unit 130 receives the detection result output by the detection unit 120, and tracks the object by using the state of the object, which is included in the received detection result. The tracking unit 130 tracks the object by determining, using a position, a size and a direction of an object included in a past frame image stored in the memory, and the position, the size and the direction of the object, which are included in the received detection result, rather than the frame image indicated by the frame number included in the detection result, whether or not the objects included in the respective frame images are the same object. In a case of having determined that the objects are the same object, the tracking unit 130 causes the objects to correspond to each other. The tracking unit 130 assigns an object number, which is similar to that of an object included in the past frame image (referred to as a past object) than the frame image indicated by the frame number included in the detection result, to a detection result regarding the object caused to correspond to the past object, and then outputs the assigned object number as a tracking result. The object number is a number for identifying the object. Note that, the tracking unit 130 assigns a new object number to a detection result related to an object that has not been caused to correspond to the past object, and outputs the assigned new object number as a tracking result. Note that, a method of tracking an object performed by the tracking unit 130 is not particularly limited, and an arbitrary method may be adopted.

The object data determination unit 140 receives the tracking result from the tracking unit 130. As mentioned above, the tracking result includes the object number, the frame number, the state of the object, the object image and the quality score, which are associated with one another, and accordingly, is also referred to as object data regarding the object. For each object number, the object data determination unit 140 refers to a state of the object and a quality score, which are associated with each of a plurality of frame images included in a predetermined time width (referred to as a window), and determines object data for use in the analysis. Specific processing of the object data determination unit 140 will be described with reference to another drawing. The object data determination unit 140 outputs the determined object data to the extraction unit 150. Note that the object data determination unit 140 may output the object image among the determined object data to the extraction unit 150.

The object data determined by the object data determination unit 140 are valid data valid for the analysis to be performed by the secondary analysis apparatus 300. Hence, it can also be said that the object data determination unit 140 performs processing of determining valid data.

The extraction unit 150 receives the object data output from the object data determination unit 140, and extracts the feature amount from the object image included in the object data. The feature amount extracted by the extraction unit 150 needs only to correspond to the analysis to be performed by the secondary analysis apparatus 300, and a type of the feature amount is not particularly limited. Moreover, a method by which the extraction unit 150 extracts the feature amount is not particularly limited, and an arbitrary method may be adopted. The extraction unit 150 outputs the extracted feature amount to the transmission unit 160. Note that, to the transmission unit 160, the extraction unit 150 may output the extracted feature amount together with the object data including the object image as an extraction source of the feature amount.

The transmission unit 160 transmits the feature amount received from the extraction unit 150 to the secondary analysis apparatus 300. As the object data, at least any of the object image, the object number associated with the object image, the frame number, the state of the object and the quality score may be associated with the feature amount transmitted by the transmission unit 160.

Figure 3:
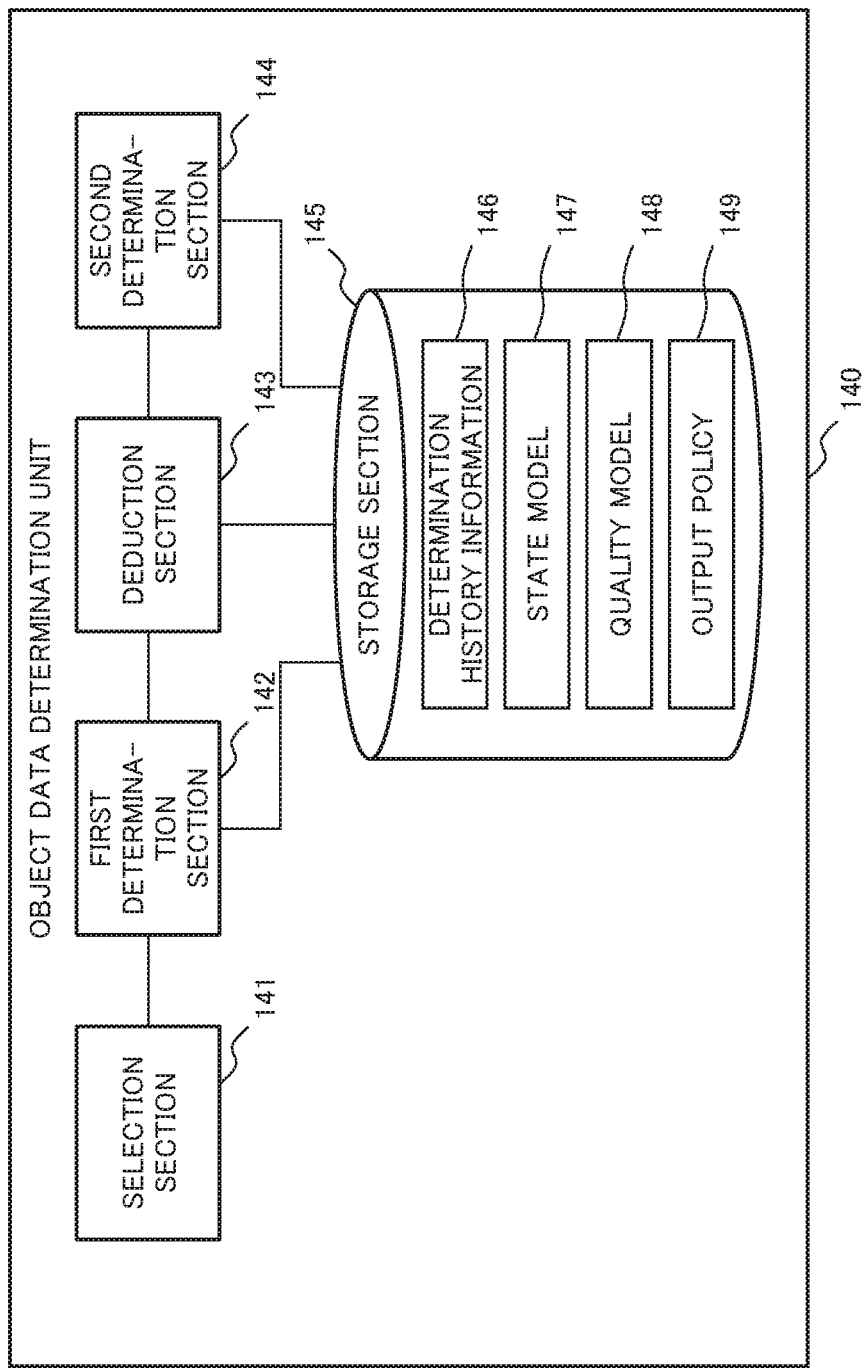
FIG. 3 is a functional block diagram illustrating one example of a functional configuration of an object data determination unit of the primary analysis apparatus in the first example embodiment.

FIG. 3 is a functional block diagram illustrating one example of a functional configuration of the object data determination unit 140 of the primary analysis apparatus 100 in the present example embodiment. As illustrated in FIG. 3, the object data determination unit 140 includes a selection section 141, a first determination section (output candidate determination section) 142, a deduction section 143, a second determination section 144, and a storage section 145. Note that the storage section 145 may be composed of another member than the object data determination unit 140.

The selection section 141 receives the object data (tracking result) to be input to the object data determination unit 140. The selection section 141 compares object data, which include the same object number in the window, with one another. Specifically, the selection section 141 compares quality scores, which are associated with the same object number in objects included in the plurality of individual frame images included in the window, with one another, and selects object data including a highest quality score. For example, every second, for each object number, the selection section 141 selects an object image having a highest quality score among object images included in a plurality of individual frame images included in one second.

For example, it is assumed that a window size is one second, and that ten frame images are included in one second. Then, it is assumed that one object is included in each of the frame images, and that such objects in the individual frame images have the same object number. In this case, the selection section 141 compares quality scores, which are associated with the individual object images included in the individual ten frame images, with one another, and selects object data including a highest quality score. Then, the selection section 141 supplies the selected object data as a selection result to the first determination section 142.

For each object number, the selection section 141 performs selection processing of selecting the object data of the object for each window. In this way, when a plurality of objects are included in a certain window, the selection section 141 outputs a selection result related to each of the plurality of objects. Note that the selection section 141 may output a window number, which identifies a window, in association with the selection result.

Note that, the window size is set in response to an amount of delay taken for the display apparatus 400 to output, to a screen, the image data imaged by the image distribution apparatus 200, and is not limited to one second.

The storage section 145 stores determination history information 146, a state model 147, a quality model 148 and an output policy 149. Besides the above, the storage section 145 may store output data output by the respective sections included in the object data determination unit 140. Each of the determination history information 146, the state model 147, the quality model 148 and the output policy 149 will be described later.

On the basis of the quality score included in the selection result, the first determination section 142 determines whether or not the selection result is object data which are an output candidate. The first determination section 142 receives the selection result. The selection result is object data including a highest quality score among object data (tracking results) related to a plurality of individual frame images included in a certain window.

Figure 4:
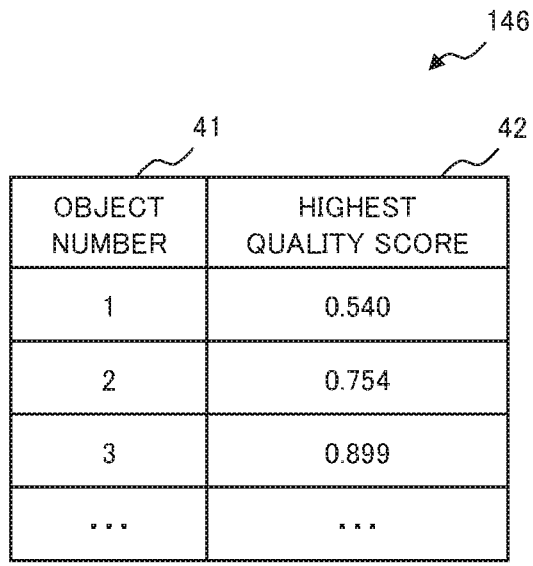
FIG. 4 is a diagram illustrating one example of determination history information to be stored in a storage section of the object data determination unit in the first example embodiment.

The first determination section 142 refers to the determination history information 146, and determines whether or not the object data which are the selection result are the object data which are an output candidate. Herein, referring to FIG. 4, the determination history information 146 will be described. FIG. 4 is a diagram illustrating one example of the determination history information 146 to be stored in the storage section 145 of the object data determination unit 140 in the present example embodiment. As illustrated in FIG. 4, the determination history information 146 includes an object number 41 and a highest quality score 42. The object number 41 is a number similar to the object number included in the object data, and is a number for identifying the object. The highest quality score 42 indicates a highest quality score among quality scores included in the object data including the object number 41, the quality scores being determined in the past by the second determination section 144 to be described later. The determination history information 146 is updated by the second determination section 144 to be described later.

The first determination section 142 refers to the determination history information 146, and determines whether or not the quality score included in the object data is larger than the highest quality score 42 associated with the object number 41 that is the same number as the object number included in the object data. When the quality score included in the object data is larger than the highest quality score 42, the first determination section 142 determines the object data as an output candidate.

Meanwhile, when the quality score included in the object data is equal to or less than the highest quality score 42, the first determination section 142 determines not to output the object data. When the quality score included in the object data is equal to or less than the highest quality score 42, it is seen that the quality of the object data is equal to or lower than that of the object data output in the past (referred to as the past object data). The object data having quality equal to that of the past object data or quality lower than that of the past object data has a lower possibility of becoming valid data than the past object data. The first determination section 142 determines not to output the object data having quality equal to that of the past object data or quality lower than that of the past object data, and can thereby reduce an amount of the data to be output to the extraction unit 150 by the object data determination unit 140. Moreover, the past object data having good quality are output, and accordingly, even if the input object data are not output, accuracy of the analysis for the object related to the object data is maintained high. Further, the first determination section 142 determines the object data which are an output candidate by a small calculation amount brought by comparison between the highest quality score 42 of the past object data and the input quality score of the object data, and accordingly, can reduce a load to be applied to the processing. Therefore, the image processing system 1 is able to reduce an amount of delay from when the image distribution apparatus 200 acquires the image data to when the information related to the image data is displayed on the display apparatus 400.

The first determination section 142 supplies the object data, which are determined as an output candidate, to the deduction section 143.

By using the state model 147, the deduction section 143 deduces a next state of the object from the object data which are the output candidates supplied from the first determination section 142. The next state of the object means a position and a size of the object in a frame image (referred to as a second frame image) different from a frame image (referred to as a first frame image) of an extraction source of the object data in the object related to the input object data. The second frame image is imaged by the image distribution apparatus 200 temporarily after the first frame image. Note that the next state may include a direction of the object. As mentioned above, one frame image is selected from an inside of a certain window by the selection section 141, and accordingly, the first frame image and the second frame image are included in different windows.

The state model 147 is a model for deducing the next state of the above-described object. The state model 147 may be a model generated in advance by a user, or may be a result learned by using learning data. For example, the state model 147 may be generated as follows. First, a frame image is divided into grids with a predetermined size. Then, with regard to an object present at a position of a certain grid, by using learning data, a position of a grid where the object is present in a frame image temporarily later than a frame image in which the object is included is counted, and a probability is calculated for each grid. Moreover, the state model 147 may be expressed in any format, and the format may be a numeric expression or a table format. Moreover, the state model 147 may be a model using a probability distribution. In other words, the state model 147 may be such a model in which the next state to be deduced by the deduction section 143 becomes a state corresponding to the probability distribution.

In the present example embodiment, it is assumed that the state model 147 is a numeric expression for calculating a next position and a next size as the next state.

For example, it is assumed that, when an upper left end of the frame image is taken as an origin point, an axis of abscissas of the frame image is taken as an X-axis, and an axis of ordinates thereof is taken as a Y-axis, the image distribution apparatus 200 images such a place where a moving direction of the object becomes a positive direction on the Y-axis. In this case, when the image distribution apparatus 200 is installed on the positive direction side on the Y-axis, if the object moves to the positive direction side on the Y-axis (approaches the image distribution apparatus 200), a size of the object included in the frame image imaged by the image distribution apparatus 200 becomes large.

Figure 5:
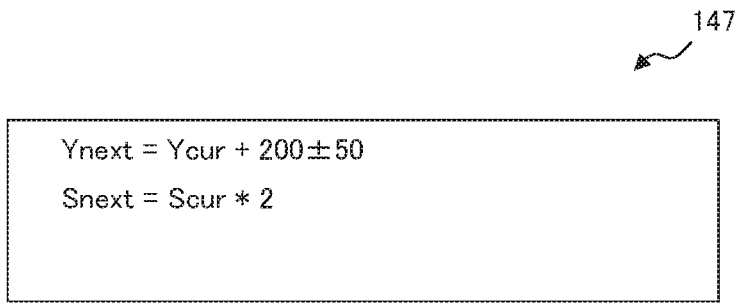
FIG. 5 is a diagram for explaining one example of a state model to be stored in the storage section of the object data determination unit in the first example embodiment.

It is assumed that, in such a case, for example, the state model 147 as illustrated in FIG. 5 is stored in the storage section 145. In FIG. 5, Ycur is a Y-coordinate of a current position of the object, and indicates a Y-coordinate of a position of the object, which is included in the input object data. Moreover, Ynext is a position of the object, which is deduced by the deduction section 143, and indicates a Y-coordinate of a position, for example, a center coordinate of a deduced object region, where the object is deduced to be present on the second frame image. Scur is a current size of the object, and indicates a size of the object region included in the input object data. Moreover, Snext is a size of the object, which is deduced by the deduction section 143, and indicates a size of the object region, which is deduced on the second frame image.

By using such a state model 147 as described above and the object data supplied from the first determination section 142, the deduction section 143 deduces the state (position (Ynext) and size (Snext)) of the object in the second frame image.

Note that, the position of the object, which is deduced by the deduction section 143, is not limited to one position, and may be a range having a predetermined width. For example, Ynext to be deduced by using the state model 147 illustrated in FIG. 5 may be a position from Ycur+150 to Ycur+250.

Then, by using the quality model, the deduction section 143 deduces second quality regarding the object on the second frame image from the deduced state of the object and from the quality score included in the object data. The second quality is related to the deduced state of the object.

The quality model 148 is a model for deducing next quality (second quality) of the above-described object. As in the state model 147, the quality model 148 may be a model generated in advance by a user, or may be a result learned by using learning data. Moreover, the quality model 148 may be expressed in any format, and the format may be a numeric expression or a table format. Moreover, the quality model 148 may be a model using a probability distribution. In the present example embodiment, it is assumed that the quality model 148 is a numeric expression for calculating the second quality.

Figure 6:
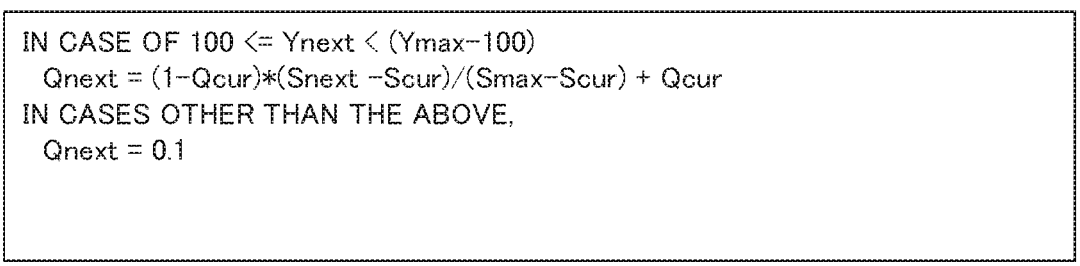
FIG. 6 is a diagram for explaining one example of a quality model to be stored in the storage section of the object data determination unit in the first example embodiment.

FIG. 6 is a diagram for explaining one example of the quality model 148. It is assumed that such a quality model 148 as illustrated in FIG. 6 is stored in the storage section 145. In FIG. 6, Ymax is a maximum value of the Y-coordinate of the frame image, and for example, is 1080. Moreover, Smax is a maximum size of the object image to be detected, and for example, is assumed to be 400×400 (that is, 160000). Note that Smax may be a value to be changed in response to Ymax and a position where the frame image is imaged. Qcur is a quality score (first quality) regarding the object at present, and indicates a quality score included in the input object data. Moreover, Qnext is a quality score (second quality) regarding the object, which is deduced by the deduction section 143, and indicates a quality score regarding the object on the second frame image.

There is a high possibility that the size of the object and the quality of the object may become proportional to each other. Hence, by using the quality model 148, the deduction section 143 deduces the quality score Qnext in response to the deduced size of the object. Note that, for example, when the size of the frame image is 1920×1080, the Y-coordinate of the center coordinate of the object region is a value close to 0, and the Y-coordinate is a value close to 1080, there is a high possibility that the whole face of the object may not be included in the object region. There is a high possibility that a feature amount extracted from such an object image may not be valid as an object to be analyzed. Hence, the deduction section 143 may deduce the quality score Qnext in such a way that a quality score related to such an object image becomes low.

Figure 7:
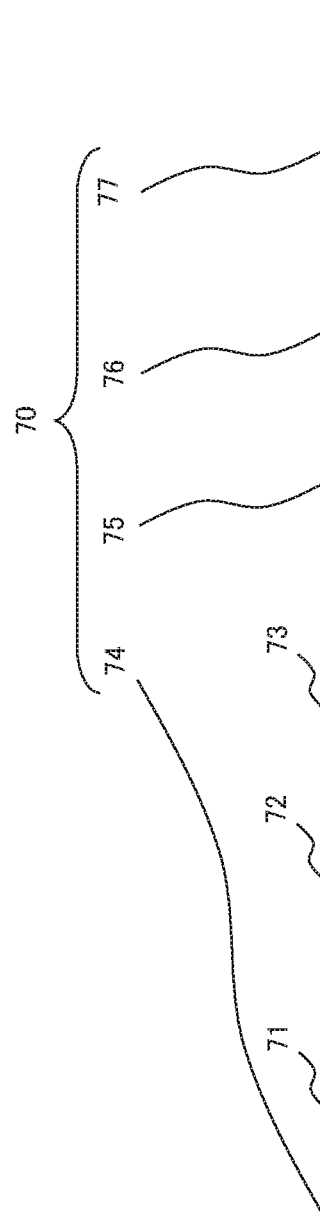
FIG. 7 is a diagram illustrating one example of results of deduction processing in a deduction section of the object data determination unit in the first example embodiment.

FIG. 7 is a diagram illustrating one example of results of the deduction processing of the deduction section 143 in the present example embodiment. In FIG. 7, for convenience of explanation, a position 71 and a size 72 of the object and the quality score (first quality) 73 thereof are also listed as the object data in which the same object number 74 is included. A deduction result 70 includes the object number 74, a position 75, a size 76 and a quality score 77.

For example, the deduction section 143 calculates Snext=20000≈141×141 from 100×100 that is a size (Scur) 72 in which the object number 74 is "1" by using "Snext=Scur×2" of the state model 147 illustrated in FIG. 5. In this way, the deduction section 143 deduces the size 76 of the object, which is a size in the next frame image. As described above, the deduction section 143 may deduce Snext by a value expressed by "size in X-axis direction×size in Y-axis direction" by using an approximate value, or may deduce Snext by a value acquired by using the state model 147 (20000 in the above-mentioned case).

Note that, as mentioned above, when the deduced position (Ynext) is located in a range having a predetermined width as illustrated in FIG. 7, there is a possibility that a plurality of quality scores may be calculated depending on positions. Such quality scores 77 regarding an object in which the object number 74 illustrated in FIG. 7 is "3" are "0.1" and "1.0", which are calculated by ratios of 70% and 30%, respectively. In such a case, the deduction section 143 may include, in the deduction result 70, the quality score 77 calculated in a higher ratio, may include, in the deduction result 70, both of the quality scores 77 together with the ratios, and may include the lower quality score 77 in the deduction result 70.

Moreover, by using the quality score Qcur and the quality score Qnext, the deduction section 143 may calculate a likelihood indicating a possibility that the second quality indicated by the deduced quality score Qnext may be improved more than the first quality (that the quality score Qnext may become higher than the quality score Qcur). For example, the quality scores 77 regarding the object in which the object number 74 illustrated in FIG. 7 is "3" are "0.1" and "1.0", which are in the ratios of 70% and 30%, respectively, and accordingly, the deduction section 143 may calculate the above-described likelihood as 0.3.

The deduction section 143 supplies such a deduction result 70 to the second determination section 144 together with the object data related to the object number 74. Note that the deduction section 143 may supply the deduced quality score 77 and the object number 74 in the deduction result 70 to the second determination section 144 together with the object data related to the object number 74.

Note that, the state model 147 and the quality model 148 may be changed in response to a place and a time zone, in which the image distribution apparatus 200 acquires the image data. For example, it is assumed that the image distribution apparatus 200 images such a place where the moving direction of the object is the positive direction on the Y-axis up to a predetermined position (for example, Y=800) on the Y-axis and is a positive direction on the X-axis from the predetermined position on the Y-axis. In this case, when the image distribution apparatus 200 is installed on the positive direction side on the Y-axis, if the object moves to the positive direction side on the Y-axis (approaches the image distribution apparatus 200), then the size of the object included in the frame image imaged by the image distribution apparatus 200 becomes large up to the predetermined position, and the direction of the object is oriented to the positive direction side on the X-axis from the predetermined position.

It is assumed that, in such a case, for example, the state model 147 as illustrated in FIG. 8 is stored in the storage section 145. Ycur, Ynext, Scur and Snext in FIG. 8 indicate values similar to those in FIG. 5. F represents a front degree of the object. The direction of the object represents a degree of horizontal rotation of the object, for example, when the case where the object confronts the image distribution apparatus 200 that images an image is taken as a reference. For example, when the object is a human face, an angle when the human face confronts the image distribution apparatus 200 is defined as 0 degree, and a counterclockwise rotation angle of the human face when a vertical direction (for example, a segment passing from a center portion of the forehead through a center of the nose to the jaw) of the human face is taken as an axis is defined as the direction of the object. An angle at which a left half of the human face is captured is −90 degrees, and an angle at which a right half of the human face is captured is 90 degrees. Note that, when the case where the object confronts the image distribution apparatus 200 is taken as a reference, the direction may be: a degree of vertical rotation of the object; a degree of rotational rotation of the object with respect to an optical axis of the imaging apparatus; or a combination of these degrees of rotation. Note that, in the present example embodiment, the front degree F. acquired from the direction of the object is a value to be calculated as 1.0 when the direction is 0 degree, and as 0.5 when the direction is −90 degrees and 90 degrees.

By using such a state model 147 as illustrated in FIG. 8 and the object data supplied from the first determination section 142, the deduction section 143 may deduce the state (position (Ynext), size (Snext) and front degree (F.)) of the object in the second frame image. Note that, in the following description, it is assumed that the direction of the object, which is deduced by the deduction section 143, is the front degree F.

Then, by using the quality model 148 as illustrated in FIG. 9, the deduction section 143 deduces the second quality regarding the object on the second frame image from the deduced state of the object and from the quality score included in the object data. The second quality is related to the deduced state of the object. Smax, Qcur and Qnext in FIG. 9 indicate values similar to those in FIG. 6.

For example, when the secondary analysis apparatus 300 performs face authentication by using a feature amount acquired from a face image, authentication accuracy is higher in a face image facing front than in face images facing right and left. Moreover, there is a possibility that the feature amount for use in the face authentication cannot be sufficiently extracted from the face images facing right and left. Hence, the quality model 148 illustrated in FIG. 9 is set in such a way that a low quality score is deduced therein when the front degree F. is a predetermined threshold value (0.7 in the case of FIG. 9) or less.

Note that, in FIG. 9, the quality model 148 is a model for deducing the quality score by using only the deduced direction in the deduced state of the object; however, the quality model 148 may be a model for deducing the quality score by using the deduced position and size.

FIG. 10 is a diagram illustrating another example of the results of the deduction processing of the deduction section 143 in the present example embodiment. As in FIG. 7, in FIG. 10, a position 71 and a size 72 of the object and the quality score (first quality) 73 thereof are also listed as the object data in which the same object number 74 is included. A deduction result 70 includes the object number 74, a position 75, a size 76 and a quality score 77. As described above, by using the state model 147 illustrated in FIG. 8, the deduction section 143 may also deduce the direction as the next state of the object, and by using the quality model 148 illustrated in FIG. 9, the deduction section 143 may output the deduction result 70, which is illustrated in FIG. 10, from the deduced next state and quality score of the object data. As described above, the state of the object is deduced in consideration of the direction of the object, whereby the accuracy of the deduced state of the object can be improved. Moreover, the deduction section 143 can deduce a quality score considering the direction.

From the deduction section 143, the second determination section 144 receives the deduction result 70 together with the object data related to the object number 74. On the basis of the quality score 77 included in the deduction result 70, the second determination section 144 determines whether or not to use, for the analysis, object data including the same object number as the object number 74 included in the deduction result 70. Then, the second determination section 144 updates a highest quality score 42 of the same object number 41 as the object number included in the object data being determined.

On the basis of the output policy 149 stored in the storage section 145, the second determination section 144 determines whether or not to use the object data for the analysis.

The output policy 149 represents a policy for determining whether or not to use the object data for the analysis. For example, the output policy 149 is "in case Qnext≥Qcur, output object data".

FIG. 11 is a diagram for explaining results of the determination processing in the second determination section 144 of the object data determination unit 140 in the first example embodiment. The results of the determination processing are output as a determination result 115. The determination result 115 is output for each object number 111 and for each window number 112. The object number 111 is a number similar to the object number included in the object data. FIG. 11 is a diagram illustrating a history of the determination result 115 for each window for object data in which the object number 111 is "1".

A quality score 113 is a quality score included in the object data input to the object data determination unit 140, and is the above-mentioned first quality (Qcur). A deduced quality score 114 is the above-mentioned second quality (Qnext), and is a quality score deduced by the deduction section 143.

As illustrated in FIG. 11, the quality score 113 in which the window number 112 is "1" is a value smaller than the deduced quality score 114. On the basis of the output policy 149 that is "in case Qnext≤Qcur, output object data", the second determination section 144 determines not to use the object data for the analysis. In other words, the second determination section 144 determines not to output the object data to the secondary analysis apparatus 300. Hence, the determination result 115 related to "1" in the window number 112 becomes "not to output" that represents a determined result.

Likewise, the second determination section 144 also determines not to output the object data individually related to "2" to "4" in the window number 112.

The quality score 113 in which the window number 112 is "5" is a value larger than the deduced quality score 114. Hence, on the basis of the output policy 149 that is "in case Qnext≤Qcur, output object data", the second determination section 144 determines to output the object data.

When it is deduced that quality (second quality) related to the object on the second frame image to be imaged temporarily after the first frame image related to the object data is higher than the first quality, there is a high possibility that data (for example, feature amount) related to the object region (second object data) extracted from the second frame image may be data more valid than the data (first object data) related to the object region extracted from the first frame image. Hence, when the first object data are used for the analysis, and the second object data are not used for the analysis, there is a possibility that the accuracy of the analysis may decrease in comparison to the case where the second object data are used for the analysis. Moreover, when both of the first object data and the second object data are used for the analysis, an amount of the object data to be output by the object data determination unit 140 is increased, and accordingly, there is a possibility that a throughput of the extraction processing in the extraction unit 150 may be increased, resulting in an increase of the delay.

However, as mentioned above, when it is deduced that the second quality related to the second object data is higher than the first quality related to the first object data, the second determination section 144 does not output the first object data. Hence, the second determination section 144 can output the second object data having the second quality that is higher quality than the first quality. In such a way, while maintaining the accuracy of the analysis processing, the object data determination unit 140 is able to reduce the amount of data to be output. Moreover, by reducing the amount of data to be output, the object data determination unit 140 is able to reduce an amount of the delay in the processing.

Note that, for example, as in the quality score 77 regarding the object in which the object number 74 is "3" in FIG. 7, when the deduced quality scores 77 are supplied to the second determination section 144 together with the ratios, the second determination section 144 may determine whether or not to use the object data for the analysis by using the deduced quality score 114 with a smaller value, or may determine whether or not to use the object data for the analysis by using the deduced quality score 114 with a larger ratio. Moreover, when a likelihood is included in the deduction result 70 to be output from the deduction section 143, the second determination section 144 may compare the likelihood and a predetermined threshold value with each other, and may determine whether or not to use the object data for the analysis on the basis of a comparison result and the output policy 149.

Note that the output policy 149 is not limited to the above-mentioned policy. For example, the output policy 149 may be "'in case of Qnext≤Qcur' or 'in case of Qcur>Qpmax×1.1', output object data". Herein, Qpmax is a highest quality score of the object data output in the past, and is the highest quality score 42 illustrated in FIG. 4.

FIG. 12 illustrates determination results determined for the object data by the second determination section 144 on the basis of this output policy 149. FIG. 12 is a diagram for explaining other results of the determination processing in the second determination section 144 of the object data determination unit 140 in the present example embodiment. FIG. 12 is different from FIG. 11 in terms of columns of the determination results. Determination results 125 illustrated in FIG. 12 are results determined on the basis of the output policy 149 that is "'in case of Qnext≤Qcur' or 'in case of Qcur>Qpmax×1.1', output object data". In such a way, as illustrated in FIG. 12, the second determination section 144 determines to output the object data related to "1" in the window number 112, the object data related to "4" in the window number 112, and the object data related to "5" in the window number 112.

In such a way, the second determination section 144 is able to determine to output object data in which quality is improved by a predetermined amount or more than the quality of the object data output in the past. In such a way, for example, the primary analysis apparatus 100 can output valid data for use in the analysis in the secondary analysis apparatus 300, and accordingly, the accuracy of the analysis processing is able to be prevented from decreasing.

Figure 13:
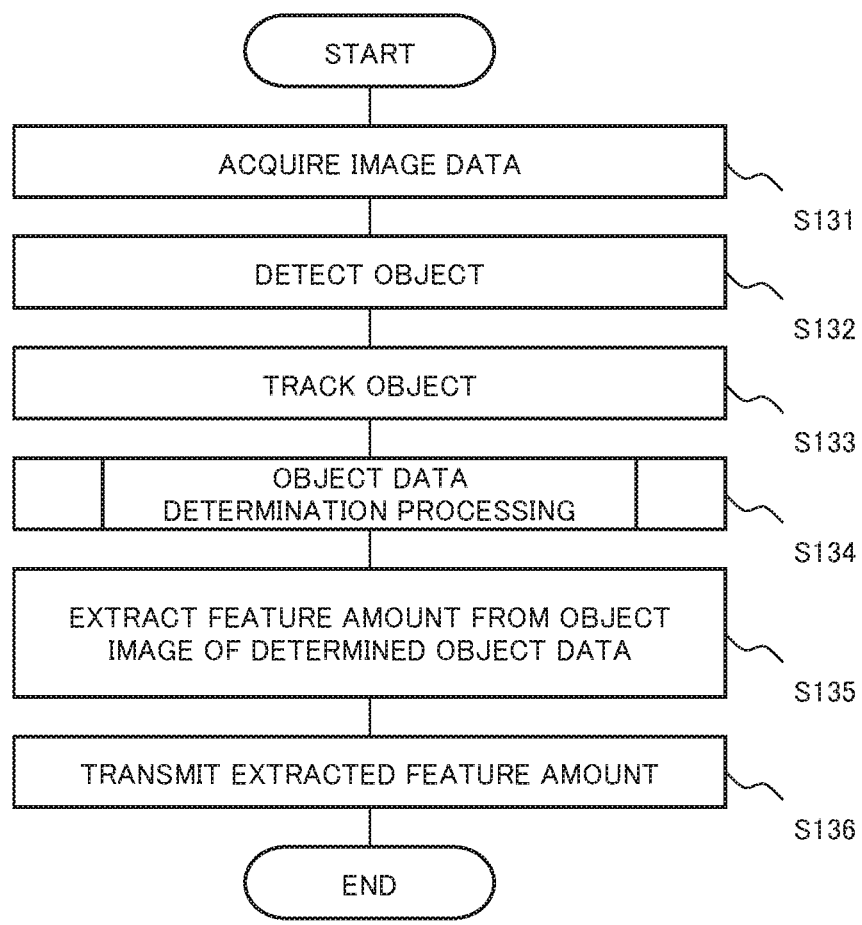
FIG. 13 is a flowchart illustrating one example of a flow of processing of the primary analysis apparatus in the first example embodiment.

FIG. 13 is a flowchart illustrating one example of a flow of processing of the primary analysis apparatus 100 in the present example embodiment. As illustrated in FIG. 13, the acquisition unit 110 acquires image data (Step S131). Then, the detection unit 120 detects objects from a plurality of individual frame images included in the image data (Step S132).

Thereafter, the tracking unit 130 determines whether or not the objects included in the respective frame images are the same object, thereby tracking the object (Step S133). Then, the object data determination unit 140 performs object data determination processing (Step S134). Thereafter, the extraction unit 150 extracts a feature amount from an object image included in object data determined in the object data determination processing (Step S135). Then, the transmission unit 160 transmits the feature amount, which is extracted in Step S135, to the secondary analysis apparatus 300 (Step S136).

Figure 14:
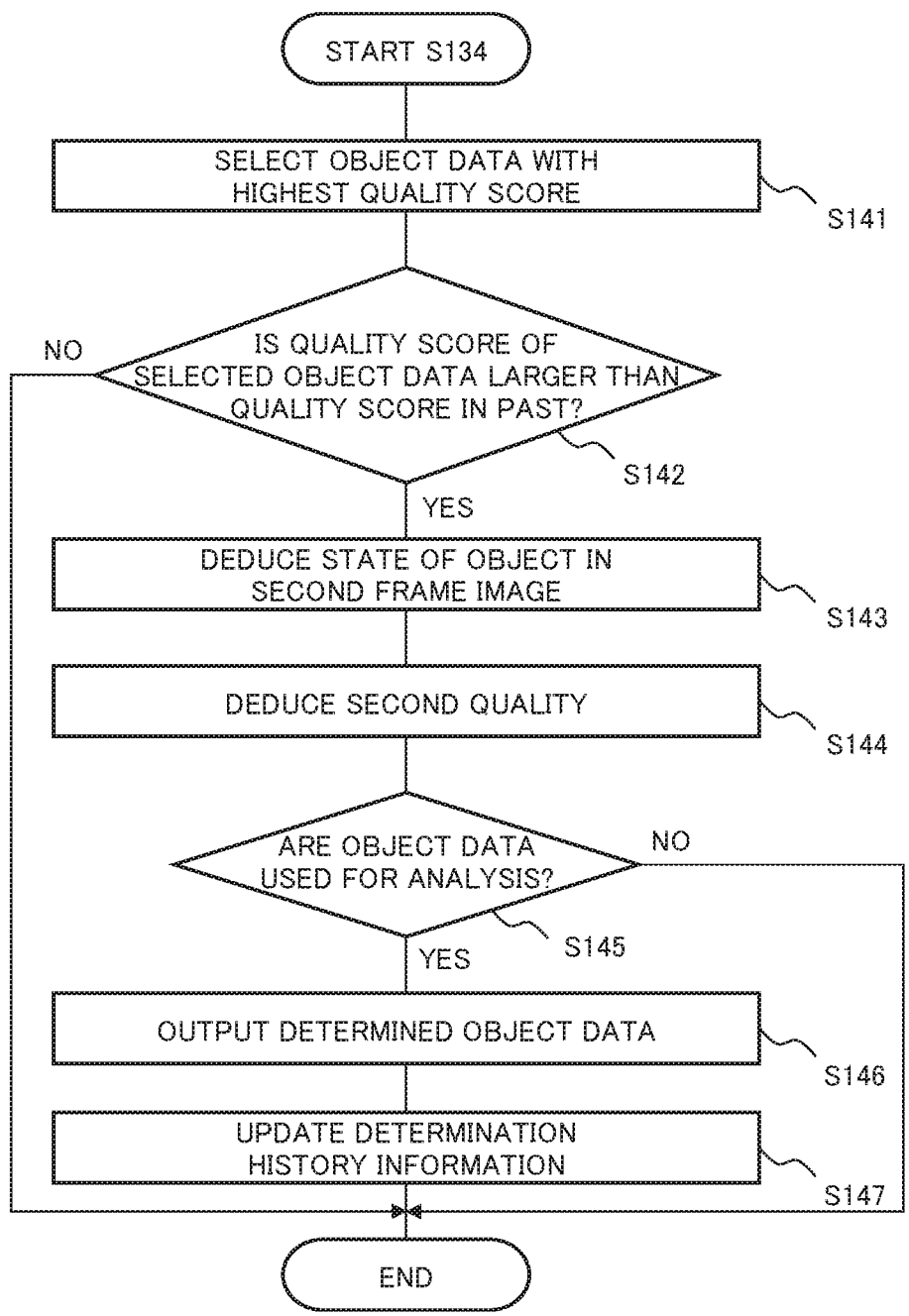
FIG. 14 is a flowchart illustrating one example of a flow of processing of the object data determination unit in the primary analysis apparatus in the first example embodiment.

FIG. 14 is a flowchart illustrating one example of a flow of the object data determination processing of Step S134 illustrated in FIG. 13. As illustrated in FIG. 14, for each object number, the selection section 141 selects object data with a highest quality score among the object data related to the plurality of individual frame images included in a window (Step S141).

Then, the first determination section 142 determines whether or not the quality score of the selected object data is larger than the highest quality score 42 that is a quality score in the past, which is related to the same object number 41 as the object number of the object data (Step S142). Then, when the quality score included in the object data is equal to or less than the highest quality score 42 (NO in Step S142), the processing is ended. In this way, the object data are not output from the object data determination unit 140, and accordingly, Steps S135 and S136, which are mentioned above, are not performed.

When the quality score included in the object data is larger than the highest quality score 42 (YES in Step S142), then by using the state model 147, the deduction section 143 deduces a state of the object in the second frame image from the object data (Step S143).

Then, by using the quality model 148, the deduction section 143 deduces the second quality from the deduced state of the object and the first quality included in the object data (Step S144).

Then, on the basis of the second quality, the second determination section 144 refers to the output policy 149, and determines whether or not to use the input object data for the analysis (Step S145). When the second determination section 144 determines not to use the input object data for the analysis (NO in Step S145), the processing is ended. When the second determination section 144 determines to use the input object data for the analysis (YES in Step S145), the second determination section 144 outputs the determined object data to the extraction unit 150 (Step S146). Then, the second determination section 144 updates the highest quality score 42 of the determination history information 146 (Step S147).

Thus, the object data determination unit 140 ends the processing of Step S134.

FIG. 15 is a diagram illustrating one example of output data 151 to be output by the object data determination unit 140 in the present example embodiment. As illustrated in FIG. 15, the output data 151 include an object number 152, a frame number 153, an object position 155, an object size 156, an object direction 157, an object image 158 and a quality score 159, which are included in the object data. Note that the output data 151 may include a window number 154. The object data determination unit 140 outputs the output data 151 including the object image 158 as illustrated in FIG. 15. In such a way, the extraction unit 150 is able to extract a feature amount from the object image 158 included in the output data 151.

As described above, in the object data determination unit 140 of the primary analysis apparatus 100 in the present example embodiment, from the state of the object on the second image, which is acquired from the input object data by using the state model 147, and from the first quality included in the object data, the deduction section 143 deduces the second quality regarding the object on the second image by using the quality model 148. Then, on the basis of the deduced second quality, the second determination section 144 determines the object data for use in the analysis. In such a way, for example, when the first quality is equal to or higher than the deduced second quality, the object data determination unit 140 determines to use the object data related to the first quality for the analysis, and when the first quality is lower than the deduced second quality, the object data determination unit 140 determines not to use the object data related to the first quality for the analysis. In other words, when it is deduced that such quality related to the object data extracted from the second image imaged temporarily after the first image related to the input object data is higher than the first quality, the object data determination unit 140 determines not to use the input object data for the analysis. In such a way, the object data determination unit 140 does not output the object data lower in quality than the object data to be input afterward, and accordingly, is able to reduce the amount of data to be output. Hence, the amount of delay due to the data processing by the primary analysis apparatus 100 can be reduced. Moreover, when the first quality of the object data is equal to or more than the quality related to the object data extracted from the second image, the second determination section 144 determines to use the object data being input for the analysis. In such a way, the accuracy of the analysis processing is able to be maintained.

For example, it is assumed that the image processing system 1 is a system that specifies a suspicious person who has broken into a shop. In this case, it is preferable that it takes a shorter time to display information regarding the specified suspicious person on the display apparatus 400 after the image distribution apparatus 200 images image data. According to the primary analysis apparatus 100 according to the present example embodiment, while maintaining the accuracy of the analysis processing by the secondary analysis apparatus 300, the amount of data to be output by the object data determination unit 140 can be reduced. Accordingly, substantially in real time, the display apparatus 400 is able to display the information regarding the suspicious person specified from the image data acquired by the image distribution apparatus 200. Moreover, since the accuracy of the analysis processing by the secondary analysis apparatus 300 is maintained, the image processing system 1 is able to suitably sense invasion of the suspicious person.

Note that, in the present example embodiment, as illustrated in FIG. 1, the description has been given on the matter that the respective apparatuses included in the image processing system 1 are apparatuses separate from one another. However, configurations of the respective apparatuses of the image processing system 1 are not limited thereto. All the primary analysis apparatus 100, the image distribution apparatus 200, the secondary analysis apparatus 300 and the display apparatus 400, which are included in the image processing system 1, may be integrated as one, or may be combined with one another.

Figure 16:
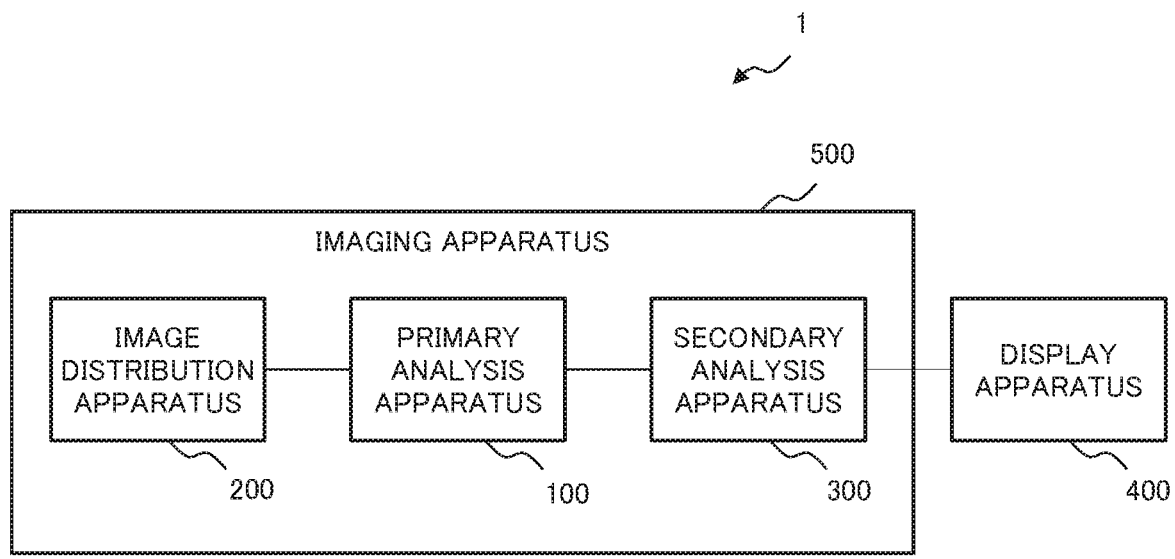
FIG. 16 is a diagram illustrating another example of the configuration of the image processing system in the first example embodiment.

FIG. 16 is a diagram illustrating another example of the configuration of the image processing system 1 in the present example embodiment. As illustrated in FIG. 16, the primary analysis apparatus 100, the image distribution apparatus 200 and the secondary analysis apparatus 300, which are included in the image processing system 1, may be mounted as an imaging apparatus 500. For example, the imaging apparatus 500 is an imaging apparatus called an intelligent camera or a network camera. Note that the imaging apparatus 500 may be configured to include the primary analysis apparatus 100 and the image distribution apparatus 200. In this case, the secondary analysis apparatus 300 and the display apparatus 400 may be an integrated apparatus, or may be apparatuses separate from each other.

The image distribution apparatus 200 included in the imaging apparatus 500 is an imaging unit that performs imaging processing by using, for example, a charge coupled device (CCD) sensor or a complementary metal oxide semiconductor (CMOS) sensor and generates image data including a plurality of frames. Then, the image distribution apparatus 200 supplies the generated image data to the primary analysis apparatus 100. In such a way, the primary analysis apparatus 100 can extract valid data from the image data. Note that in this case, the acquisition unit 110 may be integrated with the image distribution apparatus 200. As described above, when the primary analysis apparatus 100 and the image distribution apparatus 200 are mounted while being integrated with each other, the imaging apparatus 500 itself can perform the processing for the image data of the imaged image. Even with such a configuration, the image processing system 1 is able to acquire the above-mentioned effect.

Second Example

A second example embodiment of the present disclosure will be described with reference to the drawings. The present example embodiment will describe a minimum configuration of solving the problem in the present disclosure.

Figure 17:
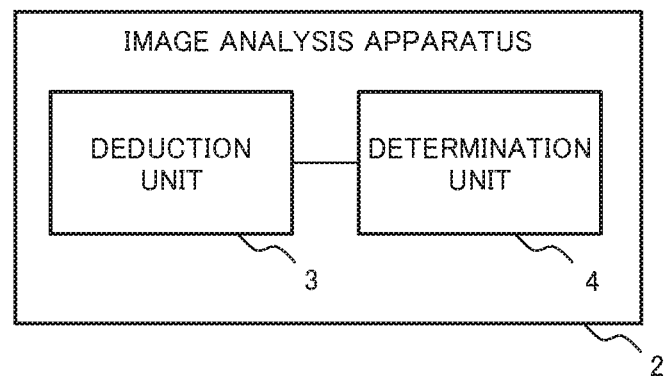
FIG. 17 is a functional block diagram illustrating one example of a functional configuration of an image analysis apparatus according to a second example embodiment of the present disclosure.

FIG. 17 is a functional block diagram illustrating one example of a functional configuration of an image analysis apparatus 2 according to the present example embodiment. The image analysis apparatus 2 has a function equivalent to that of the object data determination unit 140 in the first example embodiment.

As illustrated in FIG. 17, the image analysis apparatus 2 includes a deduction unit 3 and a determination unit 4. The deduction unit 3 has a function of the deduction section 143 in the above-mentioned first example embodiment. By using a quality model, the deduction unit 3 deduces second quality from a state of an object, which is acquired from object data input by using a state model, and from first quality. The object data are data which are regarding the object and are to be input to the image analysis apparatus 2. For example, the object data include a position and a size of the object in a first image, and first quality regarding the object in the first image. The first quality and the second quality are indices which indicate that the object data are data valid for analysis processing, and for example, are indices to be acquired in response to the position, the size and the direction of the object, a condition at an imaging time for the object, and the like.

The state model is a model for deducing the position and the size of the object in the second image. The first image and the second image are different images. For example, the second image is an image imaged temporarily after the first image. The quality model is a model for deducing the second quality regarding the object in the second image.

The determination unit 4 has a function of the second determination section 144 in the above-mentioned first example embodiment. On the basis of the deduced second quality, the determination unit 4 determines whether or not to use the object data for analysis. For example, when the second quality indicates quality equal to or lower than the first quality, the determination unit 4 determines to use the object data for the analysis, and when the second quality indicates quality higher than the first quality, the determination unit 4 determines not to use first image data for the analysis.

Figure 18:
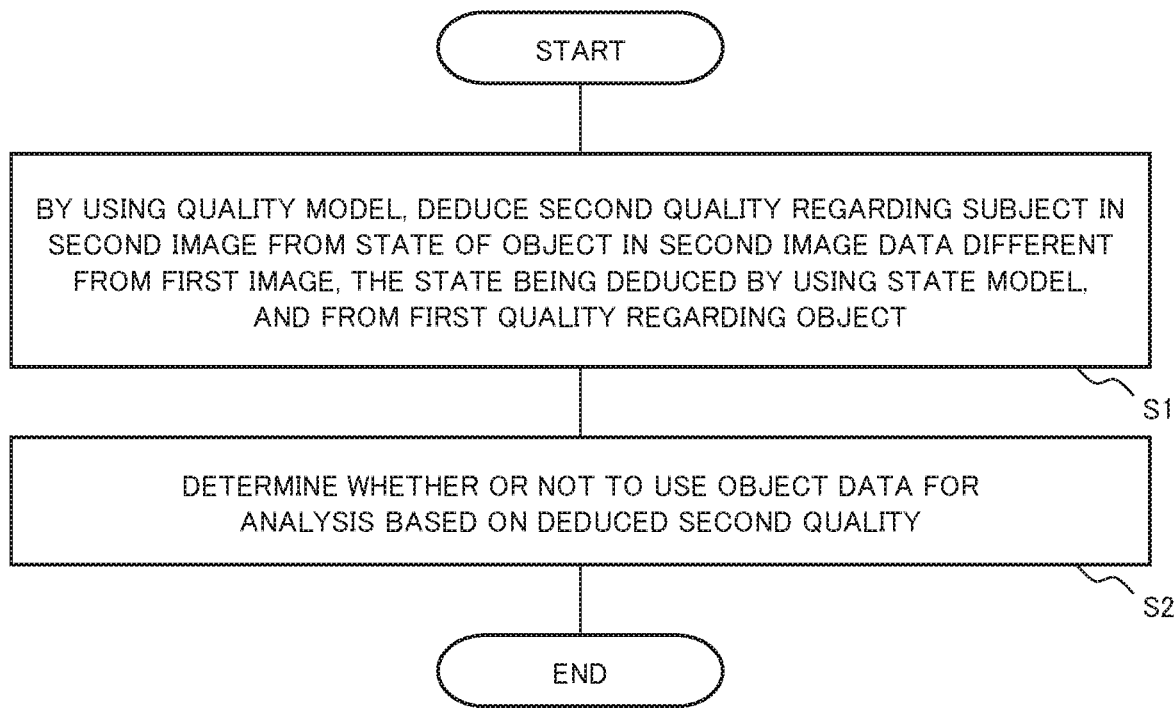
FIG. 18 is a flowchart illustrating one example of a flow of processing of the image analysis apparatus according to the second example embodiment.

FIG. 18 is a flowchart illustrating one example of a flow of processing of the image analysis apparatus 2 according to the present example embodiment. As illustrated in FIG. 18, from the state of the object in the second image and from the first quality, the deduction unit 3 of the image analysis apparatus 2 deduces the second quality regarding the object in the second image by using the quality model (Step S1). As mentioned above, the second image is an image different from the first image. For example, the second image is acquired after the first image. Moreover, the state of the object in the second image is the position and the size of the object in the second image, and is deduced by using the state model. The quality model is a model for deducing the second quality regarding the object in the second image.

Thereafter, on the basis of the second quality deduced in Step S1, the determination unit 4 determines whether or not to use the object data for the analysis.

Thus, with a small delay amount, the image analysis apparatus 2 according to the present example embodiment is able to reduce the amount of data to be output while maintaining the accuracy of the analysis processing. A reason for the above is that the determination unit determines the object data for use in the analysis on the basis of the second quality deduced by the deduction unit 3. In such a way, for example, when the first quality is equal to or higher than the deduced second quality, the image analysis apparatus 2 can determine to use the object data related to the first quality for the analysis, and when the first quality is lower than the deduced second quality, the image analysis apparatus 2 determines not to use the object data related to the first quality for the analysis. In such a way, when it is deduced that such quality related to the object data extracted from the second image imaged temporarily after the first image related to the input object data is higher than the first quality, the image analysis apparatus 2 determines not to use the input object data for the analysis. Hence, the image analysis apparatus 2 does not output the object data lower in quality than the object data to be input afterward, and accordingly, is able to reduce the amount of data to be output. Hence, the amount of delay due to the data processing by the image analysis apparatus 2 can be reduced. Moreover, when the first quality of the object data is equal to or more than the quality related to the object data extracted from the second image, the determination unit 4 determines to use the object data being input for the analysis. In such a way, the accuracy of the analysis processing is able to be maintained.

(Regarding Hardware Configuration)

Figure 19:
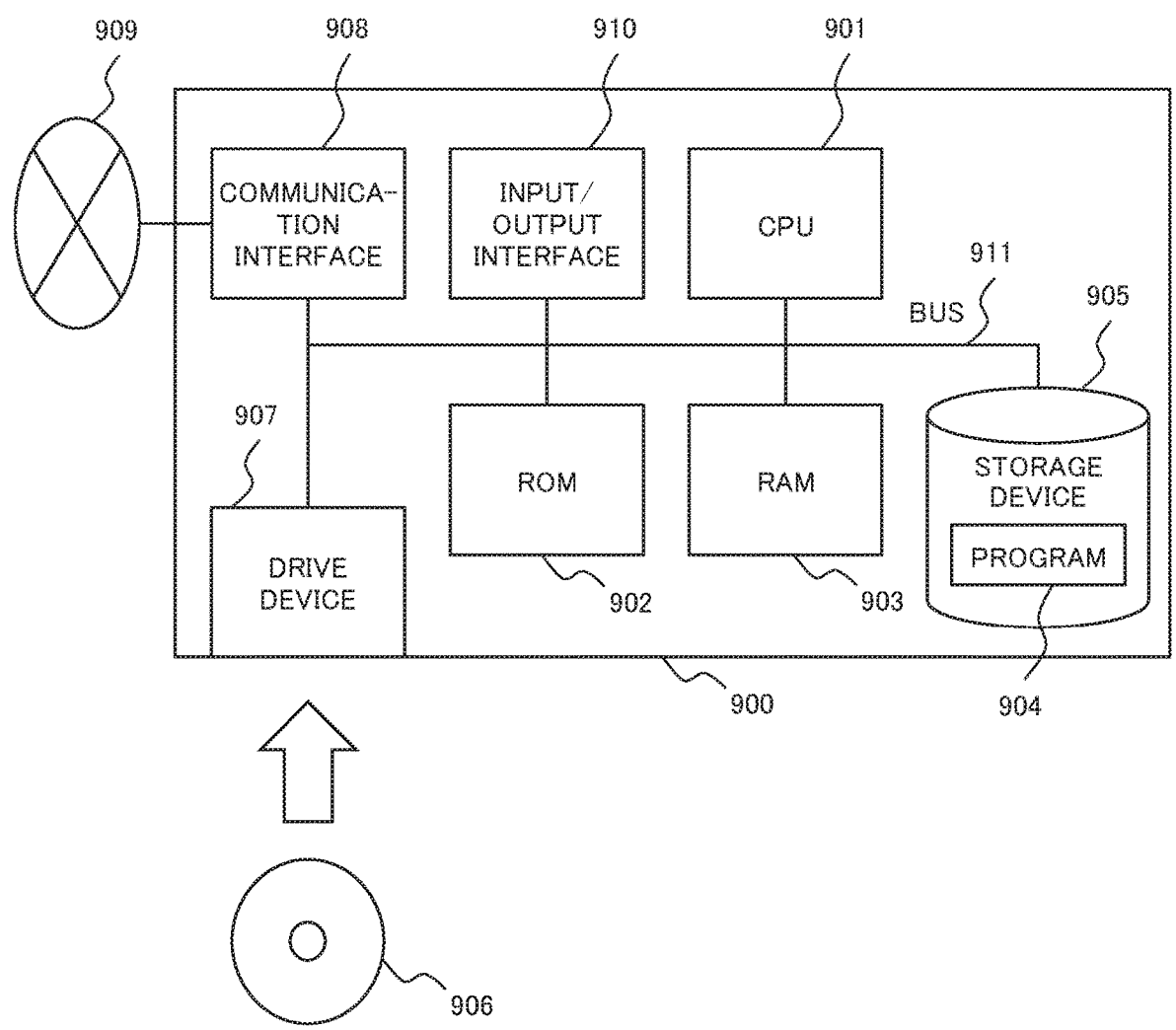
FIG. 19 is a diagram illustratively explaining a hardware configuration of a computer (information processing apparatus) capable of achieving the respective example embodiments of the present disclosure.

In the respective example embodiments of the present disclosure, the respective components of the primary analysis apparatus 100 and the image analysis apparatus 2 and the respective components of the object data determination unit 140 of the primary analysis apparatus 100 indicate functional blocks. A part or all of the above-described respective components are achieved, for example, by arbitrary combinations of an information processing apparatus 900 as illustrated in FIG. 19 and programs. FIG. 19 is a block diagram illustrating one example of a hardware configuration of the information processing apparatus 900, which achieves the respective components of the respective devices. As an example, the information processing apparatus 900 includes a configuration as below.

Central processing unit (CPU) 901
Read only memory (ROM) 902

Random access memory (RAM) 903
Program 904 to be loaded in the RAM 903
Storage apparatus 905 that stores the program 904
Drive apparatus 907 that performs read and write with a recording medium 906
Communication interface 908 to be connected to a communication network 909
Input/output interface 910 that inputs and outputs data
Bus 911 that connects the respective components to one another The respective components of the primary analysis apparatus 100 and the image analysis apparatus 2 and the respective components of the object data determination unit 140 of the primary analysis apparatus 100 are achieved in such a manner that the CPU 901 acquires and executes the program 904 that achieves functions of the components. For example, the program 904 that achieves the functions of the respective components is stored in advance in the storage apparatus 905 and the ROM 902, and is executed by being loaded in the RAM 903 by the CPU 901 according to needs. Note that the program 904 may be supplied to the CPU 901 via the communication network 909, or may be stored in advance in the recording medium 906, and the drive device 907 may read out the program and supply the program to the CPU 901.

Methods of achieving the primary analysis apparatus 100 and the image analysis apparatus 2 include various modified examples. For example, each apparatus may be achieved by an arbitrary combination of an information processing apparatus 900, which is separate for each component, and a program. Moreover, a plurality of the components provided in the respective apparatuses may be achieved by an arbitrary combination of a single information processing apparatus 900 and a program.

Moreover, a part or all of the respective components of the respective apparatuses are achieved by other general-purpose or dedicated circuitry, processors and the like and combinations thereof. Such component may be composed of a single chip, or may be composed of a plurality of chips connected to one another via a bus.

A part or all of the respective components of the respective apparatuses may be achieved by combinations of the above-mentioned circuitry and the like and a program.

When a part or all of the respective components of the respective apparatuses are achieved by pluralities of information processing apparatuses, circuitries and the like, the pluralities of information processing apparatuses, circuitries and the like may be arranged centrally, or may be distributed. For example, the information processing apparatuses, the circuitries and the like may be achieved as a mode in which the respective components are connected to one another via a communication network, the mode including a client and server system, a cloud computing system and the like.

Note that, the above-mentioned respective example embodiments are suitable example embodiments of the present disclosure, and the scope of the present disclosure is not limited only to the above-described respective example embodiments. It is possible for those skilled in the art to correct and replace the above-described respective example embodiments within the scope without departing from the spirit of the present disclosure, and to construct example embodiments modified in various ways.

REFERENCE SIGNS LIST

1 Image processing system
2 Image analysis apparatus
3 Deduction unit
4 Determination unit
100 Primary analysis apparatus
110 Acquisition unit
120 Detection unit
130 Tracking unit
140 Object data determination unit
141 Selection section
142 First determination section
143 Deduction section
144 Second determination section
145 Storage section
146 Determination history information
147 State model
148 Quality model
149 Output policy
150 Extraction unit
160 Transmission unit
200 Image distribution apparatus
300 Secondary analysis apparatus
400 Display apparatus
500 Imaging apparatus

The invention claimed is:

1. An image analysis apparatus comprising:
a memory configured to store an instructions; and
at least one processor configured to execute the instructions to perform:
   detecting an object and a first state of the object from a first image of a current object data that is input into the image analysis apparatus,
   deducing, from the first state of the object in the first image, a second state of the object in a second image, input after the first image, by using a state model,
   predicting, on a basis of the first state and the second state of the object, a first quality regarding the first image and a second quality regarding the second image by using a quality model, and
   determining not to use the current object data for an analysis when the first quality is lower than the second quality.

2. The image analysis apparatus according to claim 1, wherein
   the state model is a model for deducing a position, a size, and a direction of the object, and
   the at least one processor is configured to execute the instructions to perform:
   deducing the second quality, based on at least any of the position, the size, and the direction of the object in the second image.

3. The image analysis apparatus according to claim 1, wherein
   the at least one processor is configured to execute the instructions to perform:
   determining to use the current object data for the analysis, when the first quality is higher than the deduced second quality.

4. The image analysis apparatus according to claim 3, wherein
   the at least one processor is further configured to execute the instructions to perform:
   determining to use the current object data for the analysis, when the first quality is higher by a predetermined value than a quality related to object data which has been determined to be used for the analysis before determining whether or not to use the current object data being input for the analysis.

5. The image analysis apparatus according to claim 1, wherein:
   the at least one processor is configured to execute the instructions to perform:
   deducing the second quality from a state of the object, the state being acquired from the current object data that is the output candidate, and the first quality, by using the quality model, and
   determining the current object data for use in the analysis, based on the second quality.

6. An image analysis method comprising:
   detecting an object and a first state of the object from a first image of current object data input into an image analysis apparatus,
   deducing, from the first state of the object in the first image, a second state of the object in a second image input after the first image by using a state model,
   predicting, on a basis of the first state and the second state of the object, a first quality regarding the first image and a second quality regarding the second image by using a quality model, and
   determining not to use the current object data for an analysis when the first quality is lower than the second quality.

7. The image analysis method according to claim 6, wherein
   the state model is a model for deducing a position, a size, and a direction of the object, and
   the second quality is deduced, based on at least any of the position, the size, and the direction of the object in the second image.

8. A computer-readable non-transitory recording medium that records a program causing a computer to execute:
   processing of detecting an object and a first state of the object from a first image of current object data that is input into an image analysis apparatus,
   processing of deducing, from the first state of the object in the first image, a second state of the object in a second image input after the first image by using a state model,
   processing of predicting, on a basis of the first state and the second state of the object, first quality regarding the first image and a second quality regarding the second image by using a quality model, and
   processing of determining not to use the current object data for an analysis when the first quality is lower than the second quality.

9. The computer-readable non-transitory recording medium according to claim 8, wherein
   the state model is a model for deducing a position, a size, and a direction of the object, and
   the deducing processing deduces the second quality, based on at least any of the position, the size, and the direction of the object in the second image.

* * * * *